| United States Patent [19]
Hosaka et al.

[11] Patent Number: 4,919,959
[45] Date of Patent: Apr. 24, 1990

[54] METHOD OF PRODUCING A TEXTURIZED MATERIAL OF A MARINE PRODUCT FROM SURIMI OF THE SAME

[75] Inventors: Hideaki Hosaka, Fukuyama; Noboru Nakatani, Saeki; Kiyotaka Aoki, Hiroshima; Koichi Shimaoka, Osaka, all of Japan

[73] Assignee: Ajikan Co. Ltd., Japan

[21] Appl. No.: 235,718

[22] Filed: Aug. 22, 1988

Related U.S. Application Data

[63] Continuation of Ser. No. 14,714, Feb. 13, 1987, abandoned.

[30] Foreign Application Priority Data

Feb. 17, 1986 [JP] Japan ............................. 61-032553

[51] Int. Cl.$^5$ .............................................. A23L 1/325
[52] U.S. Cl. .................................... 426/574; 426/516; 426/643
[58] Field of Search ............... 426/574, 643, 104, 516

[56] References Cited

U.S. PATENT DOCUMENTS 4,439,456  3/1984  Kammuri et al. ............. 426/574 X
4,579,741  4/1986  Hanson et al. ................. 426/574 X
4,816,278  3/1989  Sasamoto et al. .................... 426/513

FOREIGN PATENT DOCUMENTS 91965  5/1985  Japan .

OTHER PUBLICATIONS

Takeshi Sano et al., Contribution of Tropomyosin to Fish Muscle Gel Characteristics, Journal of Food Science, vol. 54, No. 2, 1989, pp. 258–264, 279.

E. G. Bligh et al., Chemical and Physical Characteristics of Lightly Salted Minced Cod, (Gadus morhua), Journal of Food Science, vol. 51, No. 1, 1986, pp. 76–78.

Primary Examiner—Donald E. Czaja
Assistant Examiner—Celine T. Callahan
Attorney, Agent, or Firm—Cushman, Darby & Cushman

[57] ABSTRACT

A method of producing a texturized material of a marine product from the "surimi" of the same. It comprises the step of feeding to a twin-screw extruder at least one of the following materials; the material prepared by heat-treatment of the "surimi", the material prepared by addition and mixing of suitable subordinate raw material to and into the "surimi" and subsequent heat-treatment of the resulting mixture, the material prepared by drying, for dehydration, of the "surimi" to make the water content thereof not greater than 70% and the material prepared by gelation of the "surimi" through the setting of the same. It further comprises the steps of treating the at least one material under pressures of 1 to 50 kg/cm$^2$ and temperatures of 100° to 200° C., by means of the twin-screw extruder, thereby processing it into a texturized material.

1 Claim, No Drawings

METHOD OF PRODUCING A TEXTURIZED MATERIAL OF A MARINE PRODUCT FROM SURIMI OF THE SAME

This is a continuation of application Ser. No. 07/014,714, filed Feb. 13, 1987, which was abandoned upon the filing hereof.

BACKGROUND OF THE INVENTION

Field of the Invention

The present invention relates to a method of producing a texturized material of a marine product from "surimi" (which is defined, here in this specification, to mean a mechanically deboned fish, or animal, meat that has been washed with water and mixed with cryoprotectants for a good frozen shelf life) of the same and, more particularly, to a method of producing a texturized material of a marine product from the "surimi" of the same so as to provide a novel texturized foodstuff, the method comprising the steps of treating by means of a twin-screw extruder at least one selected from the group consisting of a material prepared by heat-treatment of "surimi", gelatinized fishpaste prepared by addition of subordinate raw material to the "surimi" and subsequent heat-treatment of the resulting mixture, and a material prepared by gelation of the "surimi" through the setting of the same.

2. Description of the Prior Art

The processed foodstuffs which use "surimi" of a marine product include marine kneaded products such as gelatinized fishpaste, fish-meat sausage and fried fish balls. These kneaded products, however, are not in conformity with the western life style of food. The products, similar to such kneaded products, which are prepared from squid, shrimp, crab, scallop, animal meat, or the like and which could conform to the western life style of food, have thus been desired to appear. To this end, the "surimi" must be processed into a textured formation. On the other hand, the "surimi" is high in water content and hence is a viscous material. For this reason, the methods which are usually adopted in the prior art have not been satisfactory as a method of processing on an industrial mass-production basis.

Under the above-mentioned existing circumstances, the present inventors made their study of the matter from the standpoint of processing machines involved and have found that the "surimi" can be easily textured when it is treated by means of a twin-screw extruder. On the other hand, however, when the "surimi" paste alone or in combination with mixing additives is treated with the extruder as it stands, it presents a "mass-flow" phenomenon because it is high in water content and is viscous. As a result, when pressure increases at the forward end of the extruder, the "surimi" or "surimi" mixture becomes liable to present a reverse flow, so that induced fluctuation of retention time of "surimi" within the extruder occurs, resulting in inability, without minute operational adjustments of the extruder, of maintenance of the high pressures and temperatures required for texturization of "surimi".

SUMMARY OF THE INVENTION

The invention has been made in view of the above-mentioned problems inherent in the prior art and the object thereof is to provide a method of producing a texturized material of a marine product from "surimi" of the same, which is capable of permitting the "surimi" to be effectively textured, thereby producing processed foodstuff of marine product having new flavor and mouthfeel as of squid, shrimp, crab, scallop or other animal meat, the flavor and mouthfeel being quite different from those experienced from conventional kneaded products.

To attain the above object, according to the present invention, there is provided a method of producing a texturized material of a marine product from "surimi" of the same, which comprises the steps of feeding to a twin-screw extruder at least one selected from the group consisting of a material prepared by heat-treatment of the "surimi", a material prepared by addition and mixing of suitable subordinate raw material to and into the "surimi" and subsequent heat-treatment of the resulting mixture, a material prepared by drying, for dehydration, of the "surimi" to make the water content thereof not greater than 70%, and a material prepared by gelation of the "surimi" through the setting of the same, and treating said at least one material under pressures of 1 to 50 kg/cm$^2$ and temperatures of 100° to 200° C., by means of the twin-screw extruder, thereby processing it into a texturized material.

The invention will now be described in greater detail. The constituent meat of the "surimi" which is used in the present invention is preferably one which consists of the whitish flesh of a marine fish product such as, for example, pollack, large-scale lizard fish, scab-bard fish, croaker, sardine, arabesque green ling, flatfish, left-eyed flounder, sea eel, horse mackerel, genuine goby, pond smelt, Japanese whiting, bighand thorny-head or shark.

In the present invention, such "surimi" is not used as raw material without being modified. Namely, when used, the "surimi" is converted beforehand into one capable of being handled like an ordinary granular material, by being increased in viscosity (visco-elasticity). The "surimi" thus increased in viscosity includes (1) a heat-treated one prepared by heating "surimi" with steam into a fish powder, (2) a heat-treated one prepared by addition and mixing of suitable subordinate raw materials to and into the "surimi", (3) a moisture-reduced one prepared by reducing "surimi" in terms of water content, and (4) a gelatinized one prepared by setting of "surimi".

The raw materials enumerated under items (1) to (4) will hereinafter be described in further detail.

The heat-treated raw material under item (1) above is one which has been prepared simply by steaming "surimi". However, subordinate raw material such as flavor, coloring matter, seasoning, or the like may be added to such raw material.

The heat-treated raw material under item (2) above is one which has been prepared by adding subordinate raw material such as starch, salt, seasoning, coloring matter or the like to "surimi", grinding the resulting material and then heating the resulting material. The grinding means may be a stone-mortar, silent cutter, or twin-screw extruder, while the heating may be performed with the use of ordinary heating method used in producing a gelatinized fish-paste, or with the use of a heating machine such as twin-screw extruder or the like.

The raw material of low water content under item (3) above is one which has been prepared by reducing the water content of "surimi" by way of freezing or of drying under a low temperature. The viscosity of "surimi" is increased in inverse proportion to the water content thereof.

The raw material under item (4) above is a gelatinized one which has been prepared by utilizing the property of "surimi" that addition of salt causes a salt-soluble actomyosin protein to be eluted, followed by conversion of the "surimi" into a viscous material which, when heated, is coagulated to have elasticity. This type of raw material may be obtained by the setting method which has hitherto been adopted, or through treatment made by a twin-screw extruder. In the present invention, the raw materials Nos. (1) to (4) can be used singly or in combination. However, it is also possible to add to each said raw material animal and vegetable proteins such as starch, defatted soybean, isolated soybean protein, soybean, gluten, egg albumen, marine beef, etc. The type and quantity of these additives may be changed according to the purposes involved.

Further, the water content of the raw material preferably is in the range of 20 to 90% although it should be varied according to the purpose involved.

The twin-screw extruder employed in the present invention may be of any type wherein the heating of the barrel can be optionally controlled within the temperature range of 50° to 200° C. and which can be heated or cooled at the forward end portion. The extruder which is provided at its forward discharge portion with a cooling type die is preferably employed. A feeding screw, a screw of reversely oriented threads, a pineapple shaped screw, and a kneading disk is preferably employed.

When the above-mentioned raw material is fed to the above mentioned twin-screw extruder, the pressure and temperature under which the material is treated can be kept substantially constant as in the case of feeding the granular material, without being followed by the troublesome minute adjustments of the extruder operation which are made in the case of feeding "surimi" as it stands. This makes it possible to easily texturize the "surimi" of squid, shrimp, crab, scallop or other animal meat into a material whose texture is in the form of its original flesh or meat texture.

In the present invention, the twin-screw extruder preferably is operated under the conditions wherein the extruding temperatures are 100° to 200° C. and the extruding pressures are 1 to 50 kg/cm$^2$. When the said raw materials are treated and processed under such operating conditions, the extruding can easily be carried out since the materials are molten immediately before the location of the die.

It is to be noted here that provision of a cooling type die at the die portion enables reduction in enthalpy of the raw material, thereby obtaining a stably extruded material without causing any flush.

The material thus obtained by way of such extrusion is one which has been sufficiently textured in the form of the original flesh texture of squid, shrimp, crab, scallop, or other animal meat. This texturization was confirmed by way of microscopic observation as well. The material was good in mouthfeel and yet was flavorous when examined from the sensual point of view.

By suitably varying the selection of the additives relative to raw material as well as the conditions for extrusion cooking, it was possible to make the texture of the resulting extruded product one which is similar in mouth-feel to the original texture of squid, dried cuttlefish, shrimp, crab, scallop, fowl, pork, beef or other animal flesh or meat. When such product was subjected to sensual evaluation, it proved to be a highly tasteful product.

DESCRIPTION OF THE PREFERRED EMBODIMENT

The invention will be more fully understood from the examples which follow.

Example 1

The raw materials shown in Table below were fed to a twin-screw extruder by means of which the mixture was heated at 110° C. into a gel. The material thus gelatinized was made a raw material (having a water content of 75%) to be fed into the twin-screw extruder again. Then, it was treated and processed by means of said twin-screw extruder. The feeding rate was 25 kg/hr; the number of rotations of the screws was 150 r.p.m.; and the heating temperature was 170° C. At this time, a cooling type long die having a length of 350 mm was used for the die portion.

TABLE

| Materials To Be Blended Together | Amount Blended (Ratio in Weight) |
|---|---|
| Frozen Surimi | 100.0 |
| Salt | 2.5 |
| Seasoning | 1.5 |
| Starch | 5.0 |
| Water | 30.0 |
| Total | 139.0 |

The product thus obtained was whitish, which had a mouthfeel characteristic of the mouthfeel experienced from squid. When pulled in a direction perpendicular to that of extruding, the product was likely to be torn off. On the other hand, when the product was pulled in the same direction as that of extruding, difficulties were encountered in tearing it off. Drying the product under a temperature of 70° C. for one hour made it possible to obtain a substance very similar to a smoked (kippered) squid.

Example 2

The raw materials shown in the Table in Example 1 were allowed to set overnight under a temperature of 10° C. into a gel. This gel was fed to, and was treated and processed by, a twin-screw extruder after it was powdered by means of a blender. The treating and processing of the gel were carried out under the conditions wherein the feeding rate was 30 kg/hr; the rotational speed of the screws was 180 r.p.m.; and the heating temperature was 180° C. At this time, a porous plate was disposed in immediate front of the die. A cooling type long die 350 mm in length was used as the die. The cooling was performed with the use of a water kept at a temperature of 0° C. The product thus obtained has a fibrous texture as of crab. The mouthfeel was moderate and the structure was likely to be easily loosened. Thus, the product was a type which is readily usable as a gelatinized fishpaste having the flavor similar to that of crab.

Example 3

The raw materials shown in the Table in Example 1 were dried under a low temperature and the water content thereof was thus decreased down to 65%. Then, the resulting raw materials were ground by means of a blender, and then were fed to the extruder. The treating and processing of the resulting material were carried out under the conditions wherein the feeding rate was 33 kg/hr; the rotational speed of the screws was 100 r.p.m.; and the heating temperature was 170° C. A die which was 10 mm in diameter and 500 mm in length was used. The product obtained was stiff. It had a lustrous surface as well, and was very similar to a thigh flesh as of fowl. It was also confirmed that the product was a type which could be ready for eating if boiled and seasoned.

As has been described above, according to the invention, there is provided a method of producing a texturized material of a marine product from the "surimi" of the same, which comprises the steps of feeding to the twin-screw extruder raw materials whose viscosity (viscoelasticity) has been made high by way of heat-treatment or gelation of the "surimi" and treating the raw materials, thereby processing the same into a texturized material. The method offers the following advantages.

(1) Where the "surimi" high in water content is treated by use of the twin-screw extruder, in the prior art it fails to be so done under a high extruding temperature and pressure unless minute adjustment is made of the operation of the extruder. In the present invention, however, raw materials are treated and processed with the viscosity being increased. This eliminates the necessity of using such minutely adjusting technique, and not only enables the texturized material to be easily mass-produced stably but also permits the raw materials thereof to be effectively texturized.

(2) New products which are different from the conventional kneaded products can be obtained from the texturized material produced with the use of the method of the invention. The new foodstuffs in particular having the mouthfeel and flavor characteristics of those experienced from squid, shrimp, crab, scallop, or animal meat, which is counted among high grade of marine products, can be obtained.

Further, the "surimi" paste alone or "surimi" paste mixed with suitable subordinate raw materials which was not subjected to heat treatment was treated under the above-mentioned operational conditions for the twin-screw extruder, i.e., under temperatures of 100° to 200° C. and under pressures of 1 to 50 kg/cm$^2$. As a result, the troublesome minute adjustments which are unavoidable in the conventional extruder operation were considerably reduced. This indicates that said temperature range and pressure range are considerably effective also in the treating and processing of the "surimi" alone or in combination with suitable subordinate raw materials which is not subjected to heat treatment.

The embodiment described hereinabove is only illustrative. The invention is not limited thereto but of course permits various modifications to be made without departing from the spirit and scope of the invention.

What is claimed is:

1. A method of producing a texturized material of a marine product from surimi of the same, comprising the steps of:

pretreating said surimi by one of heat-treating said surimi, adding and mixing additional raw material to and into said surimi and subsequently heat-treating the resulting mixture, drying by means of dehydration said surimi so that the water content thereof is between 25 and 70 percent, and gelling said surimi through the setting of the same, so as to form a pretreated material;

feeding to a twin-screw extruder at least one said pretreated material; and pressurizing said at least one pretreated material under pressure of 7 to 30 kg/cm$^2$ while simultaneously heating said at least one pretreated material to a temperature of 150° to 190° C., by means of said twin-screw extruder, thereby processing it into a texturized material.

* * * * *